United States Patent
Myers

[11] Patent Number: 5,805,143
[45] Date of Patent: Sep. 8, 1998

[54] STYLUS MOUNT FOR A COMPUTER MOUSE

[76] Inventor: Paula J. Myers, 19933 Trinity St., Detroit, Mich. 48219

[21] Appl. No.: 631,354

[22] Filed: Apr. 12, 1996

[51] Int. Cl.⁶ ........................................... G09G 5/08
[52] U.S. Cl. ............................. 345/163; 345/179
[58] Field of Search .................... 345/156, 161, 345/163, 173, 179; 248/118, 118.1, 918

[56] References Cited

U.S. PATENT DOCUMENTS

| Re. 35,342 | 10/1996 | Louis et al. | 345/179 |
|---|---|---|---|
| 251,206 | 12/1881 | Forbush . | |
| D. 305,424 | 1/1990 | Pressley, Sr. | D14/100 |
| 4,550,316 | 10/1985 | Whetstone et al. | 345/163 |
| 4,599,799 | 7/1986 | Lopez | 33/18.2 |
| 4,780,707 | 10/1988 | Selker | 178/18 |
| 4,791,249 | 12/1988 | Santoro | 178/18 |
| 5,340,972 | 8/1994 | Sandor | 235/472 |
| 5,490,647 | 2/1996 | Rice | 248/118 |

FOREIGN PATENT DOCUMENTS

| 1245-781A | of 0000 | Canada | 345/158 |

*Primary Examiner*—Matthew Luu
*Attorney, Agent, or Firm*—Dykema Gossett PLLC

[57] ABSTRACT

The hand held apparatus is removably mounted on a computer mouse and generates on the screen of the computer various graphics, paintings and/or drawings in accordance with a selected computer program. The apparatus includes a stylus mount adapted to be removably secured to the computer mouse and a swivelable stylus carried by the stylus mount for actuating the computer mouse. The movement made with the apparatus reflects the way the user regularly uses the computer mouse.

15 Claims, 2 Drawing Sheets

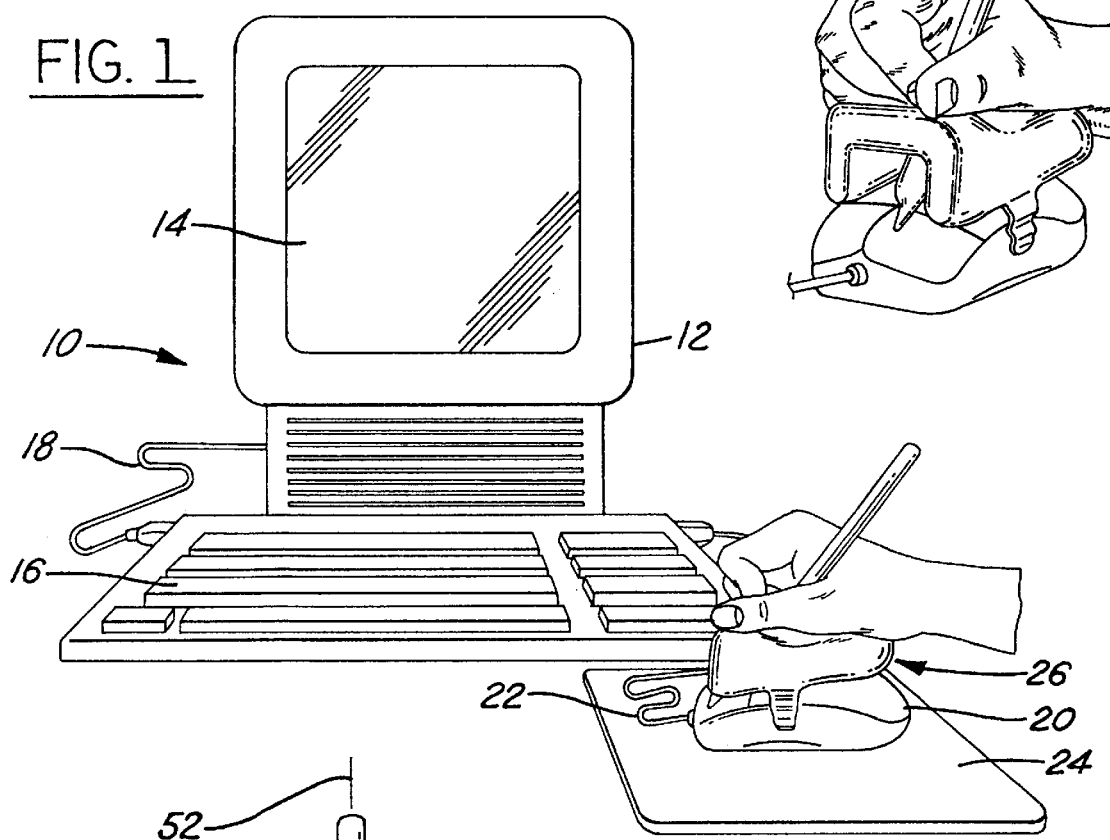
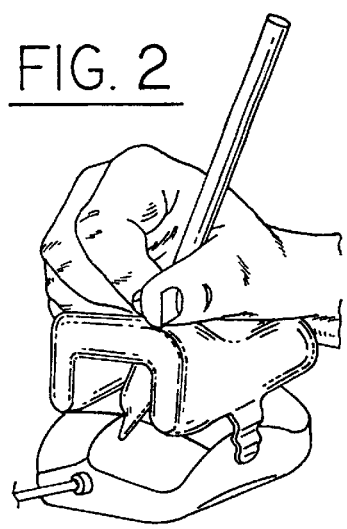
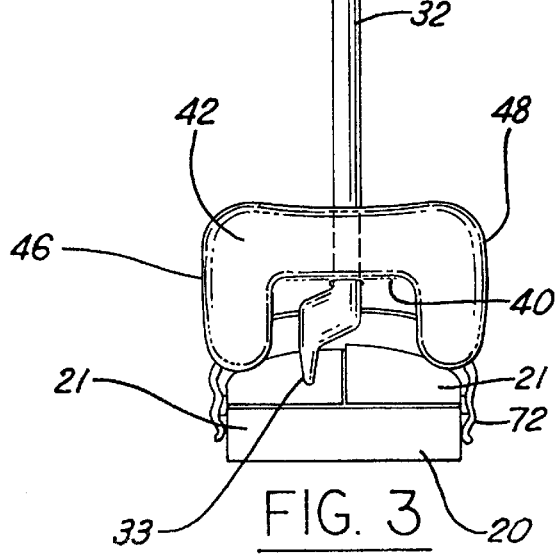
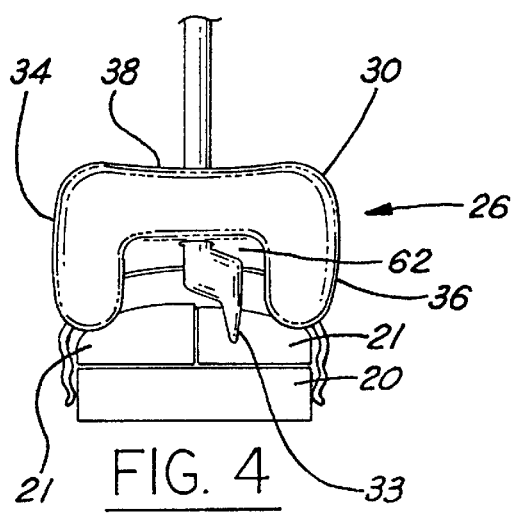

STYLUS MOUNT FOR A COMPUTER MOUSE

BACKGROUND OF THE INVENTION

1. Field of the Invention

This invention is for use with a computer system including a computer terminal, a stand-alone keyboard and a computer "mouse" used to activate the computer.

2. Description of Prior Art

It is very difficult to utilize a computer mouse for generating on the screen of the computer terminal various graphics, paintings and/or drawings in accordance with a selected computer program. Various systems have been provided to permit graphics, paintings and/or drawings to be made on the screen of the computer terminal using a selected computer program. Such systems include the use of electric pens or graphic tablets which permit the computer operator to be creative and have controlled freedom to draw, paint or design on the computer. Such is not easily achievable by using the standard computer mouse alone. In addition, the use of electric pens or graphic tablets or plotters are expensive and not readily available to persons of ordinary financial means. The present invention is directed to a hand held apparatus which can be provided at the fraction of the cost of an electronic stylus or pen since no added software or system updates, computer RAM or parts are required to function.

SUMMARY OF THE INVENTION

It is the feature of the present invention to provide a hand held apparatus for mounting on a computer mouse for generating on the screen of the computer terminal various graphics, paintings and/or drawings in accordance with a selected computer program.

A further feature of the present invention is to provide a hand held apparatus for mounting on a computer mouse which includes a stylus mount adapted to be removable secured to the computer mouse and a swivelable stylus carried by the stylus mount for actuating the computer mouse. This arrangement permits for a more natural movement and control of the computer mouse when using various graphics, painting and drawing programs.

A still further feature of present invention is to provide a hand held apparatus for mounting on a computer mouse which includes a stylus mount and a stylus that provides the operator with creative and controlled freedom to draw, paint and design on the computer which is not easily achievable by using the standard computer mouse alone.

Another feature of the present invention is to provide a hand held apparatus for mounting on a computer mouse wherein the swivelable stylus is rotatably carried by the stylus mount so as to permit the activating or distended end of the stylus to activate or to click on one or the other of the buttons provided on the mouse.

Still another feature of the present invention is to provide a hand held apparatus for mounting on a computer mouse which consists of two components, namely the stylus mount and the stylus, with the stylus mount having the side edges thereof provided with downwardly depending resilient-like clips for engaging the sides of the computer mouse.

A further feature of the present invention is to provide an apparatus of the aforementioned type wherein the stylus mount has a unitary body made from a synthetic polymer such as polyvinyl chloride.

A still further feature of the present invention is to provide a hand held apparatus of the aforementioned type wherein the stylus is made from a synthetic polymer such as polyvinyl chloride.

Another feature of the present invention is to provide a hand held apparatus for mounting on a computer mouse which is simple in construction, easy and economical to manufacture and is efficient in operation.

These and other features will be apparent to the reader after reading the following description and studying the drawings.

BRIEF DESCRIPTION OF THE DRAWINGS

FIG. 1 is a perspective view of a computer system showing the computer terminal, keyboard, pad and computer mouse, with the hand held apparatus of the present invention mounted on the computer mouse for generating on the screen of the computer terminal various graphics, paintings and/or drawings in accordance with a selected computer program.

FIG. 2 is a perspective view of the computer mouse with the hand held apparatus mounted thereon and including a stylus mount carrying a swivelable stylus under the control of the operator for actuating or clicking on one or the other of the buttons provided on the computer mouse.

FIG. 3 is a front elevational view of the hand held apparatus and computer mouse, showing the swivelable stylus in one position for actuating one of the buttons of the computer mouse.

FIG. 4 is a front elevational view of the hand held apparatus mounted on a computer mouse, with the swivelable stylus rotated 180° to actuate or to click on the other button provided on the computer mouse.

DESCRIPTION OF A PREFERRED EMBODIMENT

Figure 5:
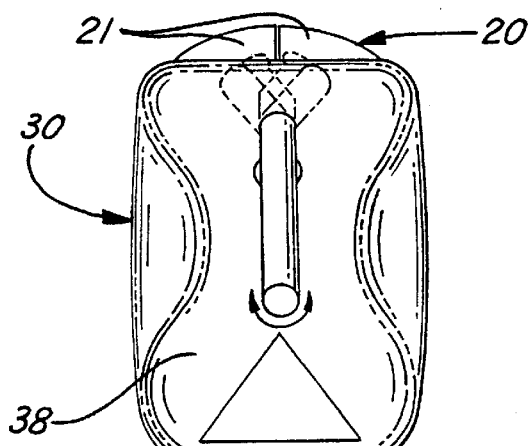
FIG. 5 is a top plan view of the hand held apparatus mounted on a computer mouse.
Figure 6:
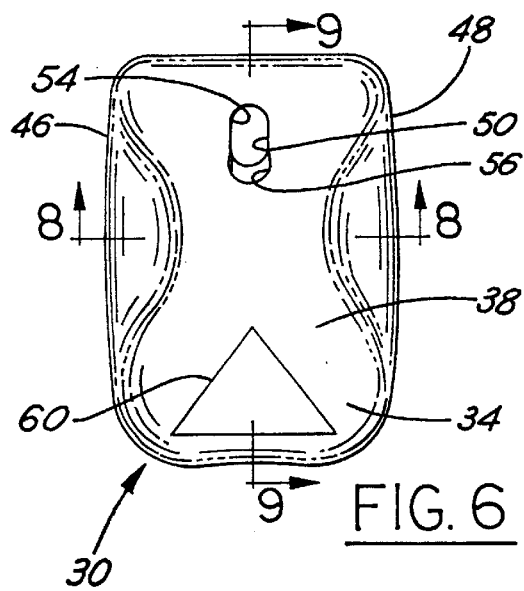
FIG. 6 is a top plan view of the stylus mount forming part of the apparatus.
Figure 8:
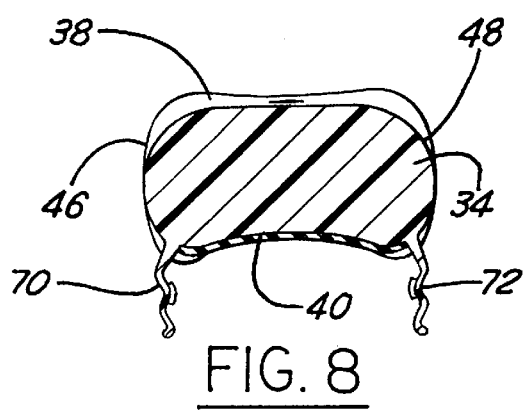
FIG. 8 is a transverse sectional view taken along the line 8—8 of FIG. 6.

With reference to FIG. 1 of the drawings, there is illustrated a computer system 10 including the computer terminal 12 having a screen 14, a keyboard 16, an electrical connection 18 between the keyboard 16 and the terminal 12, and a computer mouse 20 connected to the computer system via an electrical conduct 22. The computer mouse 20 is adapted to move along the mouse pad 24. The computer system 10 including the keyboard 16 and mouse pad 24 are mounted on a support surface such as the top of a desk in the usual manner. The mouse 20 on the undersurface thereof is provided with a rotatable ball, not shown, which permits the mouse 20 to move easily across the surface of the pad 24 in order to activate the computer and to thereby generate the desired information on the computer screen 14. The computer mouse 20 may have one, two or three buttons 21 as is known in the art. For illustration purposes, a two button computer mouse 20 is illustrated in the drawings.

Mounted upon the mouse 20 is a removable clip-on hand held apparatus 26 which is designed to attach to most standard computer mouses that are available with the Macintosh computer and various IBM compatible PC's. The apparatus 26 is a non-electronic apparatus or device which consists of two major components including the stylus mount 30 and the swivelable stylus 32. The stylus mount 30 and stylus 32 are each preferably made in a mold from a light weight moldable material such as a synthetic polymer. As an example, polyvinyl chloride may be used. Various foam materials may also be used.

The stylus mount 30 has a unitary or one-piece body 34 having a smooth outer skin 36. The body 34 has an upper or top surface 38, a bottom surface 40, a front surface 42, a back surface 44 and a pair of side surfaces 46 and 48. The body 34 is approximately the same width as the computer mouse 20 and is slightly shorter than the computer mouse 20 as shown in the drawings.

Figure 9:
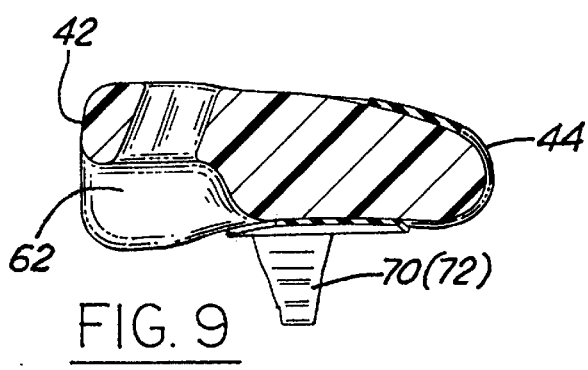
FIG. 9 is a longitudinal sectional view taken along the line 9—9 of FIG. 6.
Figure 11:
FIG. 11 is a bottom view of the stylus looking in the direction of line 11—11 of FIG. 10.
Figure 10:
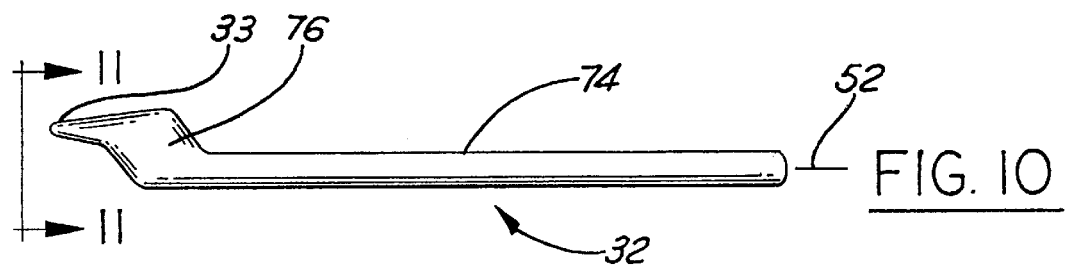
FIG. 10 is an elevational view of the stylus.

The surfaces of the body 34 where they intersect are curved or rounded thereby eliminating sharp edges to provide a comfortable grip for the hand. The top surface 38 is generally flat in the center with curved surfaces at the edges. The top surface 38 slopes downwardly from front surface 42 to rear surface 44 as best illustrated in FIG. 9.

The stylus mount 30 has a centrally located elongated opening or slot 50 having a central axis which coincides with the longitudinal axis 52 of the stylus 32 when mounted in a vertical position at the front edge 54 of the slot 50. The swivelable stylus 32 may be titled as shown in FIGS. 1 and 2 to occupy the rearward portion 56 of the slot 50 as shown in FIG. 9. Thus, the elongated slot 50 permits the stylus 32 to be moved from a vertical position to an inclined position to meet the hand requirements of the operator and to provide comfort and ease during operation of the hand held apparatus 26 and computer mouse 20.

An adhesive back pad 60 may be provided on top surface 38 to cushion the hand of the user and to prevent slippage between the stylus mount 30 and the hand.

Figure 7:
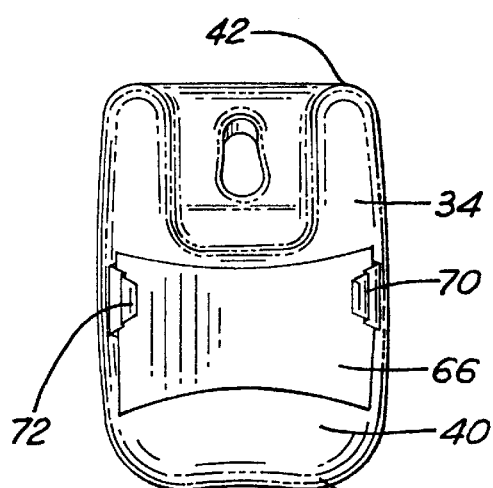
FIG. 7 is a bottom view of the stylus mount.

The bottom surface 40 is provided at the front of the stylus mount 26 with a large cavity, groove or cut-out 62 which affords an area which permits the operating end or distended point 33 of the stylus 32 to swivel from one position to another as shown in FIGS. 3 and 4. An adhesive base pad 66 (FIG. 7) is secured to the generally curved bottom surface 40 to prevent slippage between the stylus mount 30 and the computer mouse 20. The bottom surface 40 has a curved portion which mates with the curved top surface of the computer mouse 20.

The unitary body 34 further includes a pair of integral resilient clips or spring-like element 70 and 72 located at the side surfaces 46 and 48 and depending downwardly from the bottom surface 40. The fastening elements 70 and 72 are made from the same polymer as the body such as polyvinyl chloride. The elements 70 and 72 are spread apart to fit over the computer mouse 20. Thereafter the elements 70 and 72 engage the sides of the computer mouse 20 as shown in FIGS. 3 and 4.

The stylus 32 is elongated like a pencil or pen. It has a handle portion 74 and an actuating portion 76 which includes the distended point 33. The axis 52 of the stylus 32 is vertical when the stylus 32 is at the front edge 54 of the slot 50. The axis 52 is inclined when the stylus 32 engages the rearward portion or surface 56 of the slot 50.

The hand held apparatus 26 when removably attached to the computer mouse 20 permits more natural movement and control when using various graphics, painting and drawing programs. It provides the user with creative and controlled freedom to draw, paint and design directly on the computer which is not easily achievable by using the computer mouse alone.

It should be appreciated that the swivel stylus 32 slips into the elongated opening 50 of the stylus mount 30 from the bottom or lower surface 40 since the actuating portion 76 of the stylus 32 is larger than the opening 50.

In use the stylus 32 is slipped into the stylus mount 30 and the hand held apparatus 26 is placed on top of the computer mouse 20. The stylus 32 is then positioned where its distended point 33 can click the button 21 of the computer mouse 20, therefore activating it. The stylus 32 can be further swiveled to activate another button 21 if the mouse contains a two or three button system.

The user's hand (right or left hand) is placed on the apparatus 26 and the user grasp the stylus 32, as in FIGS. 1 and 2. The palm of the hand of the user is placed on the stylus mount 30 and the user slides the stylus 32 in one of the two positions (vertical or inclined) for comfort and for a more centralized feel.

It should be appreciated that no added software or system updates, computer RAM or parts are required to function as is the case with electronic pens and graphic tablets. All that is required is the computer mouse and pad which together with the hand held apparatus mounted on the computer mouse aids the computer operator in producing a more controlled drawing environment.

It should be appreciated that the use of the stylus gives the user perception when drawing which is not the case when using the computer mouse alone.

The clip-on mount with a slide in stylus that swivels in position to accommodate and operate a one or two button mouse (Note: Some three button mouse can be used, depending on its width and depth). The stylus pen has a unique angled point that distends out from the base of the pen allowing it to swivel and activate one, two or three button mouse, with the press of a finger. It is used in aiding the computer mouse to have greater and accurate control when using the various art and computer graphic programs; as well as performing the general computer commands and tasks. The art will have a more natural look, and very pleasing results.

The stylus mount allows you to utilize the various tools in graphic software programs with greater ease from using the paintbrush to airbrush. It gives the user satisfactory control. The stylus mount is user friendly as well as economical. Made of light-weight, pliable material and molded for comfort. The actual operation is performed by clipping the mount with the stylus pen already slid into position, on top of the mouse. The stylus pen is positioned where its' distended point can click the mouse button, activating it; or swivel to the button(s) (referring to the two and three button mouse) position that activates the mouse.

In use, the fingers of the user should be grasped around the stylus pen in a drawing or writing position, this allows you to direct the mouse with ease. The user's hand should rest on top of the mount, while the lower arm does most of the work, as far as movement. The movements made with the mounted stylus should reflect the way the user regularly use the mouse, by itself.

Located on top of the mount are two stylus positions for sliding the stylus pen into either one, for maximum drawing comfort. These sliding positions are centered on the mount, this gives the user a centralized feel which harmonized with the cursor on the computer screen. This alleviates any feel of imbalance because the mouse roller ball, located directly under the button of the mouse, becomes the central point of movement due to the mounted stylus positioning on top of the mouse.

What I claim is:

1. A hand held apparatus for mounting on a computer mouse for generating on the screen of the computer various graphics, paintings and/or drawings in accordance with a selected computer program comprising:
   a. a stylus mount adapted to be removably secured to the computer mouse;
   b. a stylus carried by the stylus mount for actuating the computer mouse;
   c. said stylus mount having a unitary body made form a synthetic polymer;
   d. said stylus mount having a unitary body which includes an upper surface, a lower surface, a pair of side surfaces, a front surface and a rear surface; and
   e. said upper surface being generally flat and said lower surface including a curved portion for mating with the top surface of the computer mouse.

2. The apparatus defined in claim 1 wherein said synthetic polymer is polyvinyl chloride.

3. The apparatus defined in claim 1 wherein said stylus is made from a synthetic polymer.

4. The apparatus defined in claim 3 wherein said synthetic polymer is polyvinyl chloride.

5. The apparatus defined in claim 1 wherein said unitary body adjacent said side surfaces is provided with spring-like elements which are carried by said body and extend in a direction away from said lower surface in order to grip the computer mouse.

6. The apparatus defined in claim 5 wherein said spring-like elements are made from the same material as said unitary body.

7. The apparatus defined in claim 1 wherein said unitary body has an opening extending between said upper and lower surfaces adjacent said front surface, said opening being centrally located between the side surfaces of said unitary body, said stylus being elongated and including a handle portion and an actuating portion engagable with the computer mouse for activating same.

8. The apparatus defined in claim 7 wherein said opening is elongated and is larger than the diameter of said stylus to permit said stylus to move in said opening and to assume an upright vertical position or an inclined position relative to the vertical.

9. A hand held apparatus for mounting on a computer mouse for generating on the screen of the computer various graphics, paintings and/or drawings in accordance with a selected computer program comprising:
   a. a stylus mount having a unitary body adapted to be removably secured to the computer mouse;
   b. a swivelable stylus carried by the stylus mount for actuating the computer mouse;
   c. said unitary body including an upper surface, a lower surface, a pair of side surfaces, a front surface and a rear surface; said upper surface being generally flat and said lower surface including a curved portion for mating with the top surface of the computer mouse.

10. The apparatus defined in claim 9 wherein said unitary body adjacent said side surfaces is provided with spring-like elements which are carried by said body and extend in a direction away from said lower surface in order to removably grip the computer mouse.

11. The apparatus defined in claim 10 wherein said spring-like elements are made from the same material as said unitary body.

12. The apparatus defined in claim 9 wherein said unitary body has an elongated opening extending between said upper and lower surfaces adjacent said front surface, said opening being centrally located between the side surfaces of said unitary body, said swivelable stylus being elongated and including a handle portion and an actuating portion engagable with button or another button of the computer mouse for activating same.

13. The apparatus defined in claim 12 wherein said elongated opening is larger than the diameter of said swivelable stylus to permit said stylus to assume an upright vertical position or an inclined position relative to the vertical to accommodate the hand of the user.

14. The apparatus defined in claim 9 wherein said stylus mount and said stylus are made from a synthetic polymer.

15. The apparatus defined in claim 14 wherein said synthetic polymer is polyvinyl chloride.

* * * * *